Nov. 1, 1960  G. A. M. PETERSEN ET AL  2,958,478
REEL CARRIER WITH LOADING AND UNLOADING MECHANISM THEREFOR
Filed July 20, 1956  4 Sheets-Sheet 1

INVENTORS
GERALD A. M. PETERSEN
ROBERT W. GOODE and
ROBERT W. SELLECK
BY Hansen and Lane
THEIR ATTORNEYS

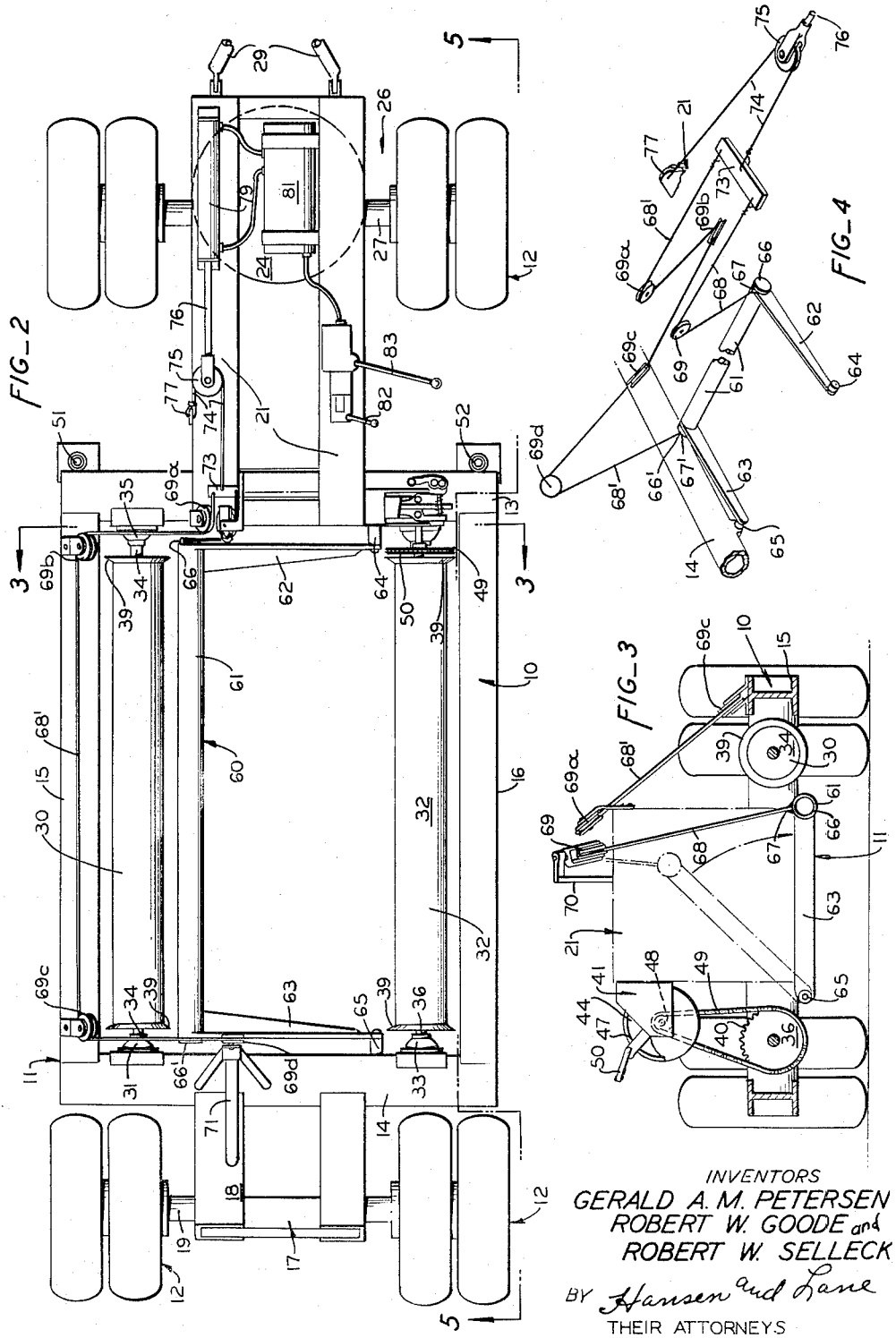

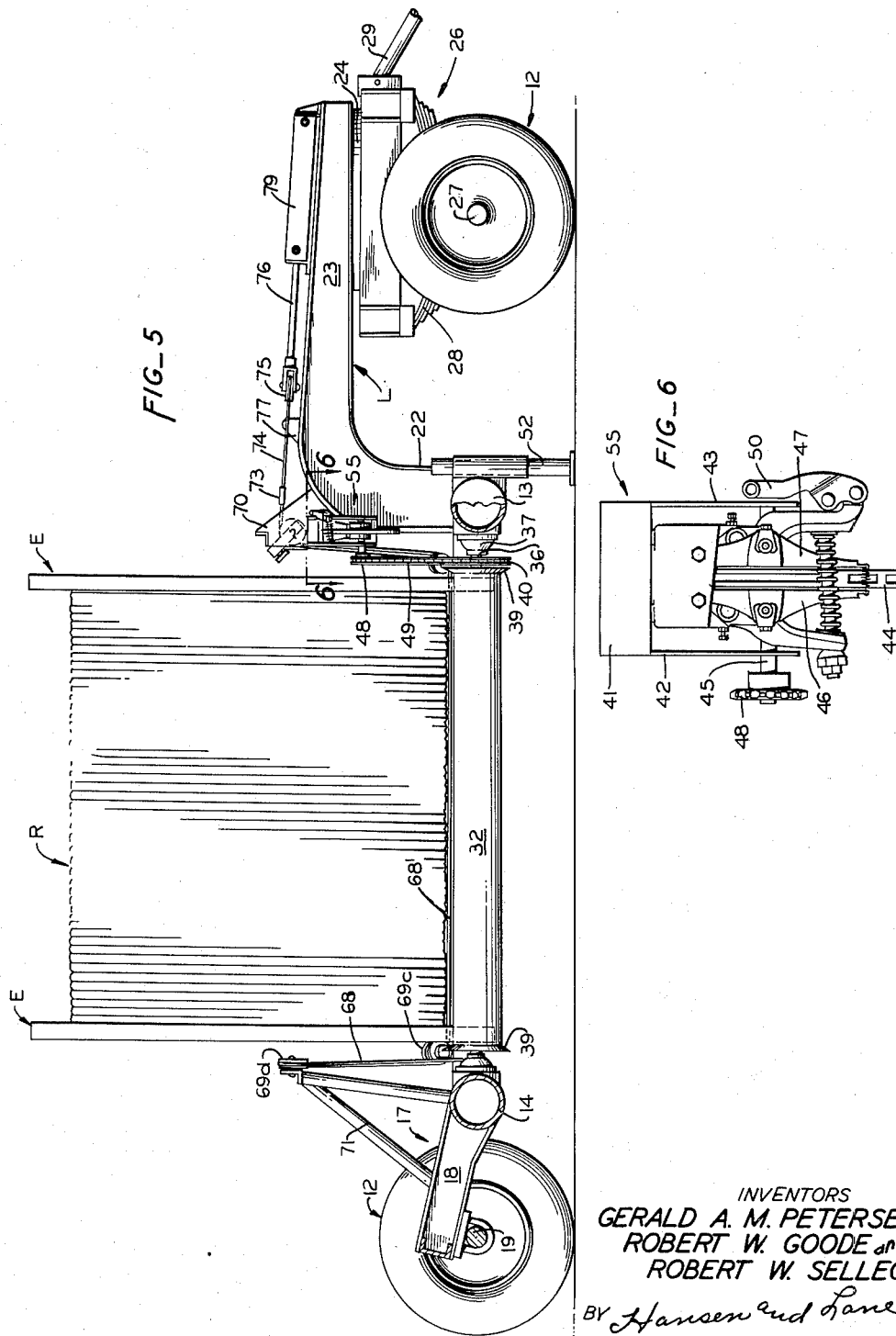

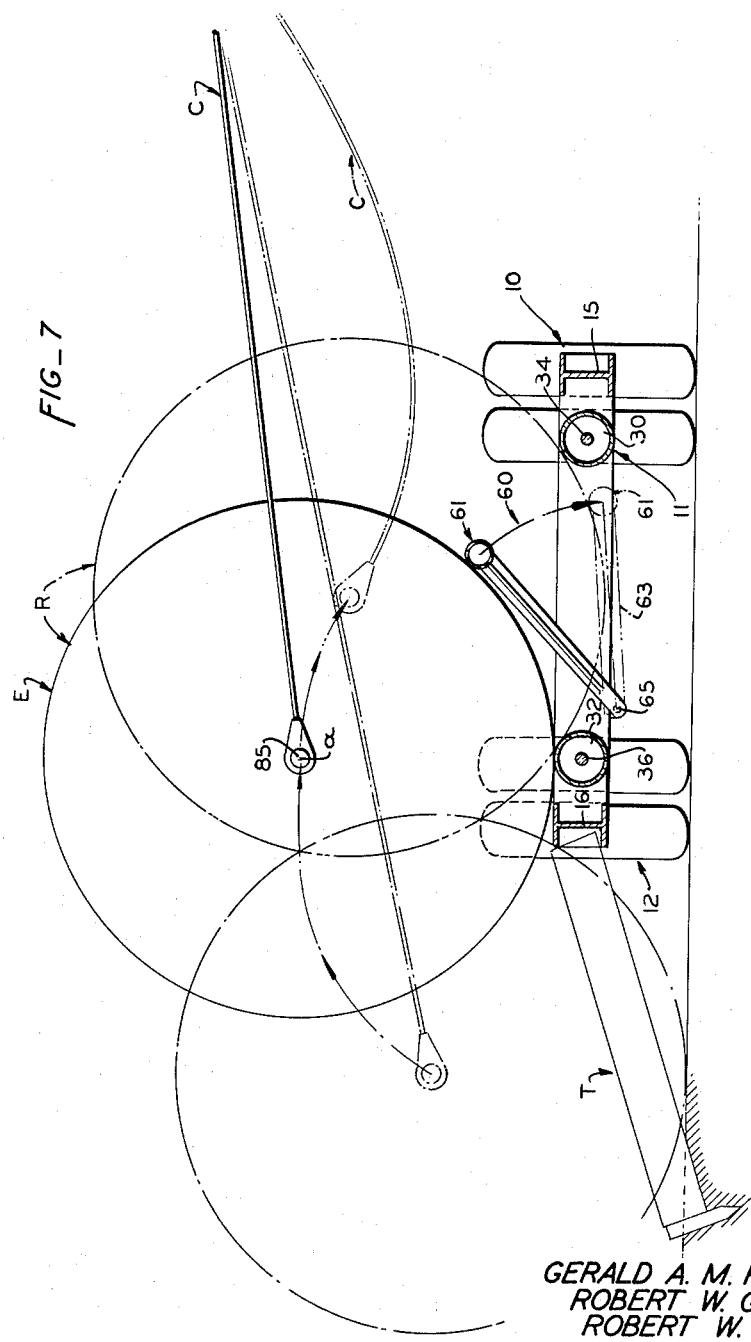

United States Patent Office 2,958,478
Patented Nov. 1, 1960

2,958,478

**REEL CARRIER WITH LOADING AND UNLOAD-
ING MECHANISM THEREFOR**

Gerald A. M. Petersen, 460 Kifer Road, Santa Clara,
Calif.; Robert W. Goode, Morgan Hill, Calif.; and
Robert W. Selleck, San Jose, Calif.; said Goode and
said Selleck assignors to said Petersen Filed July 20, 1956, Ser. No. 599,072

6 Claims. (Cl. 242—86.5)

This invention relates to reel carriers and more particularly to a mobile type reel support and mechanism associated therewith for loading and/or unloading cable reels relative to the carrier.

In the construction of high tension power lines it has been the custom to string cable supplied on reels up onto the cross arms of poles or towers for spanning cross country. Medium sized reels have been used in the past mainly because anything larger had been cumbersome and difficult to control and to handle. With the advent, however, of tension wire stringers such as illustrated in copending application Serial No. 479,041, filed December 31, 1954, it is now possible to control the tension of and to string out cable of diameters from ½ inch to 1½ inch and greater with assurance that the cable will not sag unduly prior to being secured to the tower cross arms. With equipment of this type it is therefore possible to string greater lengths of cable requiring fewer splices thereby minimizing the cost of construction mainly because other members of the crew need not stand by until the splices have been made and the cables secured.

Since the introduction of high tension wire stringers of the type mentioned above, cable manufacturers are now supplying cable on larger reels accommodating cable of greater diameter as well as continuous or greater lengths of cable thereby minimizing the number of splices required in the stringing of cable over the towers.

It must be remembered that high tension power lines are strung on right of ways in the most direct path possible irrespective of any irregularity in terrain. Consequently regardless of whether it must be strung over residential areas, highways, transportation right of ways and the like, no temporary support for the cable is required and most important of all, traffic need not be halted or detoured. While the tension wire stringing apparatus mentioned has means for suitably supporting reels up to five and six feet in diameter now that greater lengths of cable can be held under tension during stringing thereof, an independent reel support separate and apart from the tensioning mechanism has been devised. To our knowledge there has been no mobile rig yet devised which was adapted to be taken into rough country and which was also adapted to support large reels.

One of the problems of supporting and handling large reels is providing loading means for positioning the heavy reels on the support without undue impact upon the support. It was contemplated that additional handling equipment such as cranes, and the like, would be required to gently load a heavy reel onto a support. However, a support which would be large enough to take the shock load occasioned by dropping a heavy reel would be prohibitively large for use in rough country.

This invention, therefore, contemplates the provision of a mobile cable reel support which carries its own integral reel loading mechanism, and which is adapted to operate in rough country.

It is another object of this invention to support a cable reel, in a manner facilitating unreeling of the cable and for maintaining the cable under tension while it is being unreeled.

It is a more particular object of this invention to provide a cradle type cable reel support, adapted to support a cable reel for controlled rotation. This object contemplates the use of braking mechanism coordinated with the reel supporting drums or cradle for preventing any over-riding when the cable is pulled.

It is yet another object to provide a reel elevating and lowering mechanism for easing the heavy reels onto or removing them from the cradle supports. In this connection we have provided an hydraulically controlled supporting sling built into the reel carrier in such a manner as to be coordinated with one reel supporting roller so as to utilize the same as a fulcrum during loading and unloading of a reel.

Other objects will become apparent from the following description, taken in connection with the accompanying drawings, in which:

Fig. 2 is a plan view of Fig. 1.

Fig. 3 is a view, partially in section, taken at 3—3 in Fig. 2.

Fig. 4 is an isogonic diagram of an elevator mechanism embodied in Figs. 1, 2 and 3.

Fig. 5 is a side view of Fig. 2 at line 5—5 thereof, one side of the frame being broken away to show a cable reel positioned upon the rollers utilized by this invention.

Fig. 6 is an enlarged detail of a brake mechanism embodied in the present invention.

Fig. 7 is a view, partially in section, showing a typical loading operation wherein cable reels are loaded onto the device of this invention.

Figure 1:
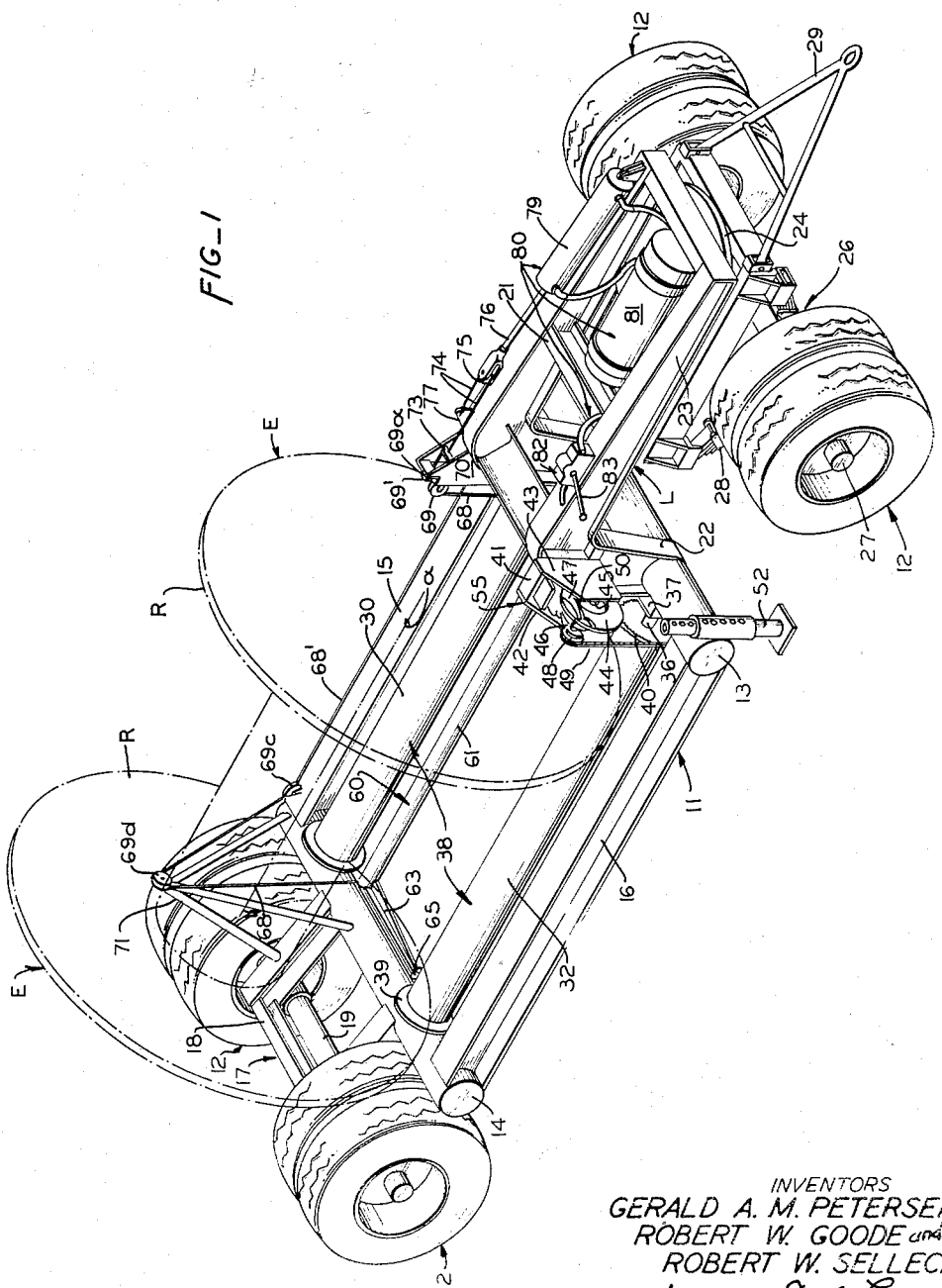
Fig. 1 is a perspective view of the reel carrier embodying the present invention.

In the drawings, the carrier 10 includes a frame 11 mounted for mobility upon wheels 12. The frame 11 which is low slung relative to the wheels 12 comprises fore and aft cross members 13 and 14 joined at their outer ends as by welding to the ends of side rails 15 and 16. More specifically stated the cross members 13 and 14 are tubular column type structural members serving as cross beams while the side rails 15 and 16 are I beams of a depth comparable to the outside diameter of the cross members 13 and 14.

A rear wheel carriage 17 consists of a lateral platform 18 welded to the aft cross member 14 so as to extend rearwardly and slightly upwardly rather than horizontally therefrom to accommodate the rear axle 19 beneath its extreme end. The rear axle 19 is secured to the underside of the platform 18 by U-bolts 20 in the manner as best illustrated in Fig. 5. Thus it will be seen that the rear axle is substantially parallel to the rear of the aft cross beam or member 14, the wheels 12 on the ends of the rear axle being of the dual type follow within the extended ends of the aft cross member 14.

The fore end of the frame 11 has a central platform 21 consisting of a gooseneck bracket L which is in the form of an L, having its shorter leg or foot position 22 vertically disposed with the extreme end thereof welded to the fore cross beam or member 13. The long leg portion 23 of the gooseneck bracket L extends horizontally and forwardly from the vertically disposed foot portion 22 to provide the platform 21 and has one-half race of a turntable or fifth wheel arrangement 24 secured to its underside for connection to the other half race of the turntable arrangement which is secured to a fore wheel carriage 26.

The fore wheel carriage 26 includes an axle 27 suspended from a dual spring structure 28, each spring having its ends secured to the fore wheel carriage 26. A pair of dual wheels journaled on the ends of the fore axle 27 complete the fore carriage to afford steerability to the carrier 10. To this end the fore carriage 26 has a draft tongue 29 pivotally secured thereto for connection to a tractor, truck, or any suitable draft vehicle, not shown, in a manner well known in the art.

A pair of rollers 30 and 32 mounted for free rotation upon axles or shafts 34 and 36 respectively are positioned longitudinally relative to frame 11, i.e., in a fore to aft direction relative to the frame. Axles 34 and 36 have their ends journaled for rotation in bearings 31, 33, 35 and 37, respectively. The bearings 31 and 33 are welded or otherwise secured to the aft cross beam 14 while the bearings 35 and 37 are similarly secured to the fore cross beam 13. Bearings 31 and 35 support the shaft 34 for roller 30 while bearings 33 and 37 support the shaft 36 to which roller 32 is secured. The rollers 30 and 32 are disposed parallel to the side rails 15 and 16 and are each disposed adjacent its respective side rail and just inside the frame structure.

In this manner the rollers 30 and 32 serve as a cradle support 38 for a reel of cable R as best seen in Figs. 5 and 7. The reel R thus sets with its axis $a$ disposed in a fore to aft direction and with the periphery of its end walls E riding upon the rollers 30 and 32 for free turning thereon. Each roller 30 and 32 has an end flange 39 thereon to maintain the reel R upon the rollers even though there may be a slight pitch in a fore or aft direction.

A sprocket 40 is secured to the axle 36 adjacent the fore flange of the roller 32. A brake housing or bracket 41 is secured to one side of the L-shaped gooseneck bracket just above the bearing 37 on the fore cross beam 13. This bracket 41 (Figs. 1 and 6) comprises spaced plates 42 and 43 between which a brake disc 44 is mounted for rotation on a shaft 45 journaled in bearings provided in the plates 42 and 43. The plates 42, 43 and bracket 41 also support a pair of brake shoes 46 and 47 embracing the disc 44 (Fig. 6). These shoes are manually movable toward the disc 44 for frictionally deterring rotation of the disc as well as the shaft 45 to which the disc is secured. The aft end of the shaft 45 has a small sprocket 48 secured thereto vertically above the sprocket 40 secured to the axle 34 of the roller 32. A chain 49 trained around the two sprockets 40 and 48 operatively connects the roller 32 to the brake disc 44 so that the otherwise free turning roller 32 can be controlled and deterred by operation of the brake mechanism 55, i.e., movement of the shoes 46 and 47 into frictional contact with the disc 44.

The brake mechanism 55 may be similar to the one shown in United States Letters Patent No. 1,978,974, dated October 30, 1934. It includes the two shoes 46 and 47 and spring means for normally urging these shoes apart or away from the disc 44. A lever 50 on the brake mechanism is connected to the two shoes in such a manner as to simultaneously urge the latter together upon manual operation of the lever 50. This lever 50 is accessible to anyone situated adjacent the platform 21 at the fore end of the frame 11.

A pair of support jacks 51 and 52 are provided at the fore end of the frame 11 to support the same and to relieve the stress upon the gooseneck L when a heavy, loaded reel is supported on the frame. These jacks are only needed on the forward end of the reel because of the relatively high bending moment which would exist there without them. Moreover they serve to level up the two rollers 30 and 32 in a fore to aft direction the better to support a reel.

To facilitate the loading and unloading of reels R onto and off of the reel carrier 10, an elevator 60 is provided. This elevator 60 consists of a U-shaped sling having its arms pivotally mounted on the frame 11 in such a manner as to ease a reel into and out of supported position on the reel cradle 38, i.e., rollers 30 and 32. More specifically the elevator 60 comprises an elevator bar 61 having its ends secured, as for example by welding, to the ends of a pair of arms 62 and 63 to provide the U-shaped sling. The bar 61 is the bight portion of the sling from which the arms extend. The free ends of arms 62 and 63 are each pivotally mounted on pinions or bearings 64 and 65, respectively, adjacent one of the rollers of cradle 38, preferably the roller (32) having operative relationship with the brake mechanism 55.

As best seen in Figs. 1, 2 and 3, the arms 62 and 63 are of a length to fit full length transversely of the frame and between the two rollers 30 and 32 of the reel cradle 38. The arm 62 is journaled on bearing 64 which is supported on the fore cross member 13 while the other arm 63 is pivotally mounted on the bearing 65 which is supported on the aft cross member 14. Thus it will be seen that the elevator bar 61 or bight portion of the U-shaped sling extends in a fore to aft direction parallel to the rollers 30 and 32. When the elevator is not in use the bar 61 is disposed adjacent the roller 30, i.e., the free rolling one opposite to the roller 32 having operative connection with the braking mechanism 55.

Referring now to Figs. 2, 3 and 4, each end of the elevator bar 61 is provided with a spool-like head or eye 66—66' over which the looped ends 67—67' of cables 68 and 68' are engaged or secured. The cable 68 is trained through a pulley 69 while the cable 68' is trained through a series of pulleys 69' so that the opposite ends of these two cables eventually extend in parallelism over the platform 21 at the fore end of the frame 11. The pulley 69 is secured to a bracket 70 at the heel of the L-shaped gooseneck just above the eye 66 on the fore end of the elevator bar 61. The series of pulleys 69' includes one pulley 69a on bracket 70 adjacent the pulley 69; two pulleys 69b and 69c secured adjacent to the respective ends of side rail 15; and a pulley 69d at the apex of a tripod frame 71 supported on the aft cross member 14 and in part on the rear platform 17. This last mentioned pulley 69d is disposed above the eye 66' at the aft end of the elevator bar 61 so that the strand of cable 68' connected to the latter exerts an efficient upward pull upon the same.

The opposite ends of the two cables 68 and 68' are secured to a common block 73 connected centrally to one end of a draft cable 74 strung through a pulley 75 at one end of a pull rod 76 and anchored as at 77 to an ear secured to the frame 11 adjacent the bracket 70. The pull rod 76 slides through one end of a closed cylinder 79 and has a piston head (not shown) arranged within the same for influence by fluid contained in a powered elevator operating system 80. This system includes an air/vacuum reserve tank 81. The main line of the system is connected to any suitable means for pressurizing the fluid or air in the system which may be hydraulically or pneumatically operated.

The elevator system 81 also includes a control valve 82 secured to the platform 21 for manually controlling the operation of the elevator 60. In the present disclosure we have shown a self-contained unit in the form of a hand pump 83 mounted on the platform 21 adjacent the control valve 82. By operating this pump the attendant, by means of the control valve 82 can raise and/or lower the elevator bar 61 at will relative to the reel supporting cradle or rollers 38.

In operation, a reel R first has to be loaded onto the reel support. The reel may be loaded from a truck bed or from a loading platform directly into the cradle or a ramp may be provided by placing timber tracks T with one end resting on the lower flange of one side rail 16 with the other end of each timber embedded in earth and held in place by a stake S as seen in Fig. 7. In this manner the wheel-like side walls of the reel R can ride up the timber tracks T for deposit into the cradle 38. The reel R may be pushed up the ramp by engaging the front bumper of a truck with the peripheries of the reel walls E or by rolling of the reel directly from a truck bed or a loading platform down into the cradle 38. In Fig. 7 we have shown another manner of loading a reel onto the cradle. In Fig. 7 a spindle shaft 85 is inserted through the axial center of the reel so as to extend from each side thereof for connection to the eye O of a pair of draft cables C having their opposite ends wound on a winch (not shown) for drawing the reel R up the timber ramp T. If the winch spool is high enough relative to the carrier so as to exert a somewhat upward pull upon the spindle shaft 85 no ramp T need be provided.

In either of the situations above mentioned it will be appreciated that to allow the reel R to drop into position on the two rollers 30 and 32 would subject the latter as well as the carrier and its frame to excessive shock. To avoid this the elevator bar 61 is employed in which case the loading is always onto that side of the reel carriage where the brake controlled roller 32 is located. Thus it will be noted that during loading of a reel the roller 32 is rendered fixed by application of friction to the disc 44 by operation of the braking mechanism 55. Now the member 32 is no longer free to roll and the reel R must roll over it rather than on or relative to it.

The elevator system 81 is operated by manipulation of the pump 83 and control valve 82 to raise the elevator bar 61 into engagement with the periphery of both reel walls E (see Fig. 7), at this point the reel R is substantially supported on both the side rail 16 and roller 32 or it can be balanced tangentially on the roller 32 while resting within the U-shaped sling provided by the elevator bar 61 and its arms 62 and 63.

Now by skillful manipulation of the control valve 82 fluid or air may be slowly relieved from the cylinder 79 so as to gently lower the reel R (clockwise Fig. 7) onto the cradle 38. Thereafter the elevator bar 61 is lowered sufficiently to disengage the periphery of each reel wall and the reel R is fully supported on the rollers 30 and 32 only. With the draft cables C and spindle shaft 85 removed, the tension wire or electrical conductive cable on the reel R can now be connected to a "come along" or rope by which it can be pulled up onto the cross arms of a power pole or tower. Of course the braking mechanism 55 must be released to enable the roller 32 to turn freely as does the opposite roller 30 during paying out of electrical cable from the reel R. However, here too the braking mechanism 55 has an important function in that the brakes are applied to deter over-rolling of the reel R during payout of the cable therefrom. Obviously, if the reel R were to gain too much momentum as the electrical cable is pulled there must be some way of retarding this over-rolling with a minimum of effort and sufficient assurance that no snagging or scratching of the electrical conductor will occur.

After a reel has been emptied of all conductive cable it can be easily removed from the cradle 38 by operation of the elevator mechanism 60. In this manner the elevator bar 61 is raised to unseat the reel from the cradle, the reel rolling over the now fixed roller 32 and side rail 16 and onto a truck bed, platform or off to one side of the carrier so that another full reel can be loaded onto the carrier in the manner as just explained.

It should here be noted that the reel carriage of the present invention can also be used for reeling in old electrical conductors or cable from power poles by using a friction drive (not shown) engageable with the free turning roller 30 so as to turn the same and with it the reel R when winding in the cable. In addition to the foregoing it will be noted that a reel R is well nested between the two rollers 30 and 32 as well as the end flanges 39 thereon, so that the entire carrier vehicle with reel thereon can be transported to another location, say several pole distances away, should such a change in location be required or desirable.

While we have described our new reel carrier and loading means therefor in specific detail it will be appreciated by those skilled in the art that it is susceptible to variation, alteration and/or modification without departure from the spirit of our invention. We therefore desire to avail ourselves of all variations, alterations, and/or modifications as fairly come within the purview of the appended claims.

What we claim as new and desire to protect by Letters Patent is:

1. In a reel carrier of the mobile trailer type for use in rough terrain including a frame having fore and aft cross beams on fore and aft wheel carriages joined at their ends by I beam side walls and each provided with bearings on which the ends of rollers are journaled, one adjacent each side wall to provide a reel cradle for supporting the periphery of the side walls of a cable carrying reel; means for loading and unloading a reel into and out of said cradle comprising; a manually controlled brake mechanism on said frame operatively connected to at least one of said rollers for retarding turning thereof as a reel is rolled into and out of said cradle, and elevator means cooperating with said brake retarded roller for easing said reel into and out of said cradle, comprising a U shaped sling having its legs pivotally mounted on the inner sides of said fore and aft cross beams for receiving said reel therebetween and its bight portion disposed to engage the periphery of the side walls of said reel adjacent the points of engagement thereof with the other one of said rollers, and powered means for raising and lowering the bight portion of said sling out of and into horizontal alignment with said frame.

2. In a reel carrier of the mobile trailer type for use in rough terrain including a frame having fore and aft cross beams on fore and aft wheel carriages joined at their ends by I beam side walls and each provided with bearings on which the ends of rollers are journaled, one adjacent each side wall to provide a reel cradle for supporting the periphery of the side walls of a cable carrying reel; means for loading and unloading a reel into and out of said cradle comprising; a manually controlled brake mechanism on said frame operatively connected to at least one of said rollers for retarding turning thereof as a reel is rolled into and out of said cradle, and elevator means cooperating with said brake retarded roller for easing said reel into and out of said cradle, comprising a U-shaped sling between said rollers including an elevator bar bight portion engageable with the periphery of the side walls of said reel and having the free ends of its arms pivotally connected to a respective fore and aft cross beam adjacent said brake retarded roller so as to embrace a reel therebetween, and a powered elevator operating means drivingly connected to said elevator bar for swinging the latter between raised and lowered position relative to said frame.

3. In a reel carrier of the mobile trailer type for use in rough terrain including a frame having fore and aft cross beams on fore and aft wheel carriages joined at their ends by I beam side walls and each provided with bearings on which the ends of rollers are journaled, one adjacent each side wall to provide a reel cradle for supporting the periphery of the side walls of a cable carrying reel; means for loading and unloading a reel into and out of said cradle comprising; a manually controlled brake mechanism on said frame operatively connected to at least one of said rollers for retarding turning thereof as a reel is rolled into and out of said cradle, and elevator means cooperating with said brake retarded roller for easing said reel into and out of said cradle, comprising a U-shaped sling within said frame having the free ends of its arms pivotally connected to said frame adjacent said brake retardable roller for straddling a reel supported on the latter and having its bight portion adapted to engage the periphery of the side walls of the cable reel to support the same in cooperation with said brake retardable roller, and powered means operatively connected to said elevator bar for raising and lowering the same relative to said frame.

4. In a reel carrier of the mobile trailer type for use in rough terrain including a frame having fore and aft cross beams on fore and aft wheel carriages joined at their ends by I beam side walls and each provided with bearings on which the ends of rollers are journaled, one adjacent each side wall to provide a reel cradle for supporting the periphery of the side walls of a cable carrying reel; means for loading and unloading a reel into and out of said cradle comprising; a manually controlled brake mechanism on said frame operatively connected to at least one of said rollers for retarding turning thereof as a reel is rolled into and out of said cradle, and elevator means cooperating with said brake retarded roller for easing said reel into and out of said cradle, comprising a U-shaped sling within said frame having the free ends of its arm pivotally connected to said frame adjacent said brake retardable roller to receive between them a reel supported on said retardable roller, said sling having its bight portion adapted to engage the periphery of the side walls of a cable reel to support the same in cooperation with said brake retardable roller, and powered means operatively connected to the bight portion of said U-shaped sling for raising and lowering the same relative to said frame, said powered means including a hydraulic ram on said fore wheel carriage, cables connected to said ram, means on said frame for guiding said cables toward the ends of the bight portion of said U-shaped sling from an overhead position relative thereto, and control means for manually operating said powered means at will.

5. In a reel carrier including a frame having fore and aft cross beams joined at their ends by side walls and each provided with bearings on which the ends of rollers are journaled, one adjacent each side wall to provide a reel cradle for supporting the periphery of the side walls of a cable carrying reel; means for loading and unloading a reel into and out of said cradle comprising; a manually controlled brake mechanism on said frame operatively connected to one of said rollers for rendering the same retardable as a reel is rolled onto the same, and elevator means cooperating with said retardable roller for easing said reel into and out of said cradle comprising a U-shaped sling between said rollers having the free ends of its arms pivotally connected to the fore and aft cross beams of said frame adjacent said retardable roller to receive between them a reel supported on said retardable roller, said sling having its bight portion adapted to engage the periphery of the side walls of a cable reel to support the same in cooperation with said retardable roller, and powered means operatively connected to the bight portion of said U-shaped sling for raising and lowering the same relative to said frame, said powered means including a hydraulic ram on said frame, cables connected to said ram, means on said frame for guiding said cables toward the ends of the bight portion of said U-shaped sling from an overhead position relative thereto, and control means for manually operating said powered means at will.

6. In a reel carrier including a frame having a pair of rollers journaled in spaced parallel relation therein to provide a reel cradle for supporting the periphery of the side walls of a cable carrying reel; means for loading and unloading a reel into and out of said cradle comprising; a manually controlled brake mechanism on said frame operatively connected to one of said rollers for retarding turning thereof as a reel is rolled onto the same, a U-shaped sling between said rollers having the free ends of its arms pivotally connected to said frame adjacent the journaled ends of said brake retardable roller to receive between them a reel supported on said retardable roller, said sling having its bight portion adapted to engage the periphery of the side walls of a cable reel to support the same in cooperation with said brake retardable roller and to lower said cable reel onto the other one of said rollers, and powered means on said frame including cables connecting said powered means to said sling, means on said frame for guiding said cables toward the ends of the bight portion of said sling from an overhead position relative thereto, and control means for manually operating said powered means at will for raising and lowering said sling relative to the other one of said rollers.

References Cited in the file of this patent

UNITED STATES PATENTS

| | | |
|---|---|---|
| 1,914,098 | Bean | June 13, 1933 |
| 2,012,118 | Cameron | Aug. 20, 1935 |
| 2,352,959 | Littell | June 24, 1940 |
| 2,647,699 | Bush | Aug. 4, 1953 |
| 2,679,987 | Saliba | June 1, 1954 |
| 2,865,576 | Woellner | Dec. 23, 1958 |
| 2,867,390 | Anrig | Jan. 6, 1959 |